United States Patent [19]
Klint, Jr.

[11] 3,722,820
[45] Mar. 27, 1973

[54] FERTILIZING ATTACHMENT FOR LAWN MOWER

[76] Inventor: Joseph E. Klint, Jr., 355 North Broadway, Joliet, Ill. 60435

[22] Filed: Mar. 22, 1971

[21] Appl. No.: 126,420

[52] U.S. Cl. ........239/129, 239/214.13, 239/214.25, 239/DIG. 6
[51] Int. Cl. .............................................B05b 3/00
[58] Field of Search....239/129, 214.13, 214.25, 263, 239/214.15, 214.17, 222, 434, DIG. 6, 563, 539

[56] References Cited

UNITED STATES PATENTS

| | | | |
|---|---|---|---|
| 1,649,745 | 11/1927 | Schellens et al. | 239/214.13 |
| 3,595,481 | 7/1971 | Enblom | 239/DIG. 6 |
| 835,928 | 11/1906 | Allen | 239/562 X |
| 2,108,872 | 2/1938 | Swallow | 239/214.13 |
| 2,594,243 | 4/1952 | Winkler | 239/563 X |

FOREIGN PATENTS OR APPLICATIONS 785,802    8/1935    France ..........................239/214.15

Primary Examiner—M. Henson Wood, Jr.
Assistant Examiner—John J. Love
Attorney—Rummler & Snow

[57] ABSTRACT

A turbo-powered attachment to a gas-engine powered lawn mower suitable for dispensing liquid fertilizers, insecticides and fungicides, connected to the exhaust stack of said engine for passage of high velocity gases therethrough, said attachment having a hollow turbo-shaft driven at high rotational speed by the high velocity exhaust gases, a supply tank with a conduit connected to one end of the hollow turbo-shaft, a valve for regulating liquid flow therethrough connected to a centrifugal spray nozzle at the other end of the hollow turbo-shaft, said attachment being adapted for mounting on the handlebar of the mower.

3 Claims, 5 Drawing Figures

Patented March 27, 1973
3,722,820
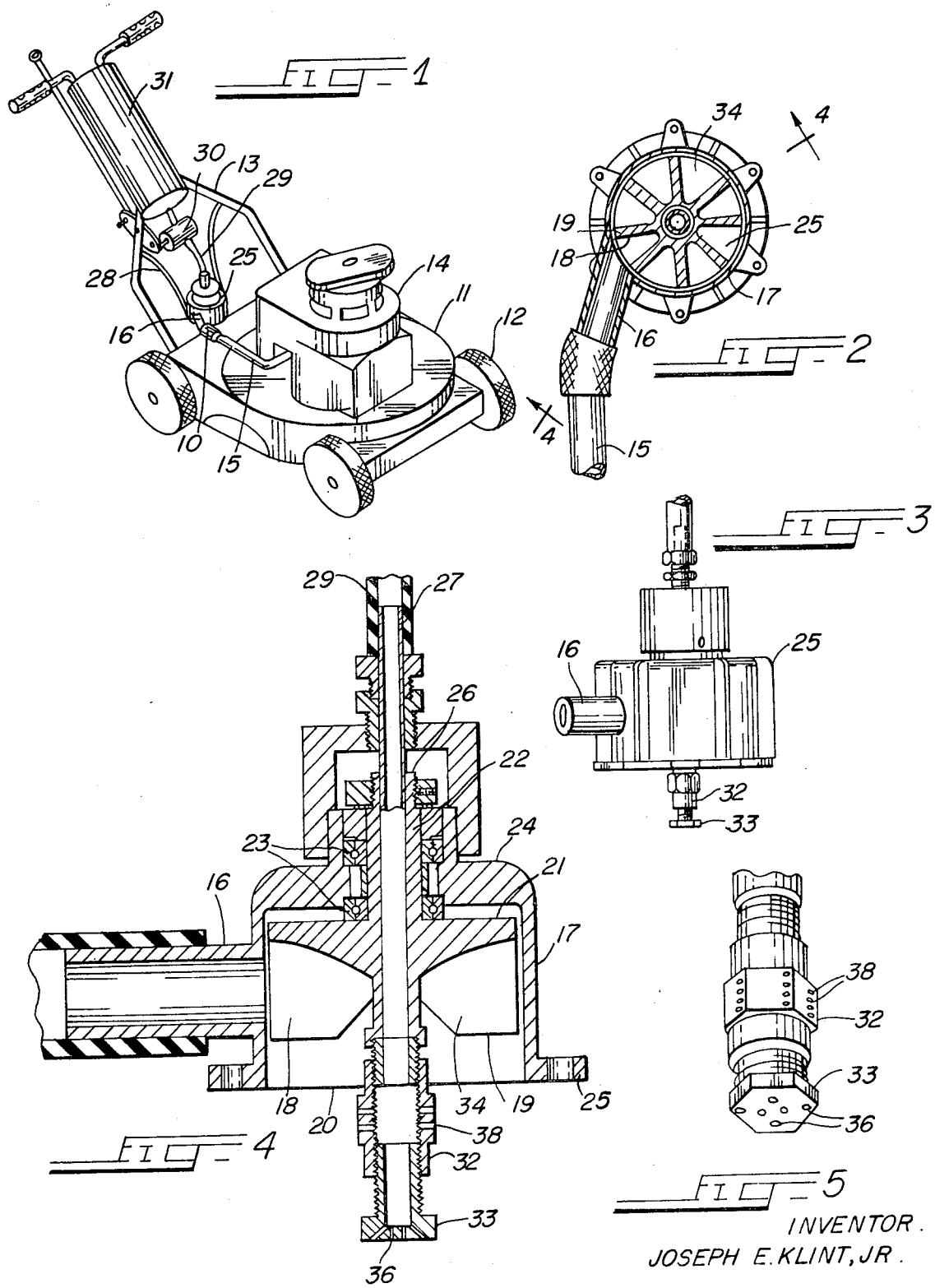
INVENTOR.
JOSEPH E. KLINT, JR.
BY Rummler & Snow
ATT'YS

FERTILIZING ATTACHMENT FOR LAWN MOWER

BACKGROUND OF THE INVENTION

This invention relates in general to an apparatus for dispensing liquid fertilizers, pesticides and fungicides in the care and maintenance of lawns and similar vegetation. It is to be recognized that lawns are usually given such a liquid treatment at most three or four times in a season, whereas lawns are generally mowed once a week.

It has been the practice for the home owner to use a lawn mower for cutting the grass and then use a separate machine or hand distribution device for spraying the lawn with weed killer or the like. Such use of multiple, single-purpose machines is economically wasteful. It is not prudent to tie up investment in many special-purpose machines, some of which will be used only a few times out of a year.

Numerous attempts have been made to solve the economics of lawn spraying by mowing and spraying at one and the same time. The prior art has dealt principally with the formulation of dual-purpose machines which by and large are just as uneconomical as the multiple single-purpose machines for the same work to be done. What has been needed in the industry is a new concept that would bring the cost of the lawn spray device in line with its low level of annual utilization.

In particular, this invention satisfies these low cost requirements dictated by low level utilization by being an attachment to and powered by an existing piece of equipment already available — notably the gas-engine powered lawn mower. As a simple attachment, it can be designed to have universal application to all engine powered mowers of either the reel or rotary type and thereby reduce its cost considerably.

This invention also promises to save the home lawn and garden expert valuable time. A device that dispenses liquid fertilizer, pesticide or fungicide over the lawn at the same time grass is being mowed saves the operator the burden of re-traversing the lawn a second time.

This invention also represents an improvement over the prior art in that it applies the fertilizer, pesticide or fungicide in a manner most suited to the needs of modern lawn care and maintenance. The use of centrifugal force, in addition to that of pressure to dispense the liquid, involves the mechanism of small scale turbulent action, making more uniform the distribution and coverage of the area concerned, as well as increasing the penetration of the product therein.

SUMMARY OF THE INVENTION

The gist of this invention lies in the concept of a turbo-powered attachment to the frame of a gas-engine powered lawn mower having a hollow turbo-shaft driven by the high velocity exhaust gas from the engine, said hollow turbo-shaft being supplied therethrough with fertilizer, pesticide or fungicide and having at one end a valve for regulating flow of liquid and at the other end, a spray nozzle rotating at high speed in a centrifugal field. The effect of the centrifugal field on the discharge from the spray nozzle is to break up the liquid particles to a more uniform and smaller size, thereby improving distribution in the application of the product to a given area.

This invention is the answer to a long-standing need in the lawn and garden equipment market for a low-cost lawn spray device adapted to be easily attached to the frame of and driven by the exhaust of a gas-engine powered lawn mower. The cost potential of this device is in line with its annual utilization.

Thus the primary object of this invention is to provide a low-cost lawn spray device adapted to be easily attached to the frame of a gas-engine powered lawn mower for dispensing liquid fertilizers, insecticides and fungicides in the care and maintenance of lawns and similar vegetation.

Another object of this invention is to provide a combination gas-engine powered lawn mower which cooperates with a lawn sprayer apparatus so that the lawn may be mowed and sprayed one and at the same time.

Still another object of this invention is to provide a gas-engine driven lawn mower with a lawn sprayer apparatus which may be adjusted to a predetermined spray intensity and ground area covered.

DESCRIPTION OF THE DRAWINGS

In order to demonstrate the invention, reference is made to the non-limiting embodiment illustrated by the drawings, in which:

FIG. 1 is a perspective view of the gas-engine powered lawn mower showing the turbo-powered lawn-spray apparatus mounted on the lawn mower frame with supply tank, and valve to regulate the flow conduit;

FIG. 2 is a top view of the turbo-powered lawn-spray apparatus with parts of the device shown along a section cut approximately halfway along the length of the exhaust gas shroud;

FIG. 3 is a side elevation of the turbo-powered lawn-spray apparatus;

FIG. 4 is a side elevation of the turbo-powered lawn-spray apparatus with parts of the device shown along the longitudinal center line in section for clarity; and FIG. 5 is a perspective view of the centrifugal spray nozzle.

DESCRIPTION OF THE PREFERRED EMBODIMENT

Referring now to the drawings in detail, it will be seen that the combination lawn mower and lawn sprayer 10 consists of a mobile frame 11 which is supported by a plurality of wheels 12 and has handlebars 13. As will be noted in FIG. 1, the combination mower and sprayer 10 is powered by an internal combustion engine 14, generally located on the upper surface of frame 11. FIG. 1 shows that the engine 14 has an exhaust gas stack 15 extending therefrom. FIG. 2 shows the exhaust gas turbo-jet nozzle 16 connected to the exhaust stack 15 and opening tangentially into a cylindrical exhaust gas shroud 17 as part of a turbo-housing 25 tangentially directing jet nozzle exhaust gas against the side 18 of a turbo-impeller blade 19 as part of the turbo-impeller 34, and as shown in FIG. 4, discharging the exhaust gas from said turbo-impeller 34 to atmosphere out the discharge end 20 of the turbo-housing 25. FIG. 4 shows the turbo-impeller 34 having a plurality of radially disposed turbo-impeller blades 19 in line with the turbo-jet nozzle 16 and integral with the turbo-disc 21 which turns on turboshaft 22. Turbo-shaft 22 is rotatably mounted on and centrally fixed by a straddle bearing support 23 located in the cover plate 24 as part of housing 25. The turbo-disc is adjacent to the cover plate 24 and offset to the side of turbo-jet nozzle 16. The rotary turbo-shaft 22 is hollow throughout its length and at one end, outside straddle-bearing support 23 in cover plate 24 connects through a transfer seal 26 to a stationary nipple 27.

FIG. 1 shows the turbo-housing 25 with jet-nozzle 16 connected to the engine exhaust stack 15 and hung on brackets 28 mounted on the handlebar 13. A fluid supply conduit 29 connects at one end with a nipple 27 extending from the turbo-shaft 22 and to a hand-operated valve 30 at the other end. The valve 30 is connected to a supply tank 31 mounted on the handlebars 13. FIG. 3 shows the centrifugal spray nozzle 32 extending outside of the discharge end 20 of the turbo-housing 25 so as to give the spray a clear sweep of the ground spray area. FIGS. 4 and 5 show the other end of the hollow turbo-shaft 22 carrying a centrifugal spray nozzle 32 in threaded engagement therewith and arranged to provide for adjustment of the spray nozzle relative to the turbo-housing 25 to give a predetermined spray intensity and extent of ground area to be covered. FIG. 5 shows the details of the vertical spray nozzle head 33 and illustrates an arrangement of vertical jets 36 and radial jets 38 opening from the interior of the nozzle.

Although but one specific embodiment of this invention is herein shown and described, it will be understood that details of the construction shown may be altered or omitted without departing from the spirit of the invention as defined in the following claims.

I claim:

1. A lawn treating attachment having a dispensing tank and a flow control means in fluid communication therewith for internal combustion engine powered lawn mowers comprising:
   a. a treating fluid supply means;
   b. a turbo-housing having an open-bottom cylindrical shroud and a cover plate mounted to the top thereof;
   c. a straddle bearing support coaxially mounted within said cover plate;
   d. a hollow turbo-impeller shaft having one end in fluid communication with the said supply means and rotatably mounted in the straddle bearing support with its other end extending beyond the open bottom of the shroud;
   e. a turbo-impeller means mounted on said turbo-shaft within the cylindrical shroud;
   f. at least one turbo-jet gas nozzle means mounted on the cylindrical shroud in flow communication with the engine exhaust and directed to impinge the exhaust gas on the turbo-impeller; and
   g. a centrifugal spraying nozzle mounted on and in fluid communication with the other end of said hollow shaft.

2. A lawn treating attachment as set forth in claim 1, wherein the turbo-impeller means comprises a turbo-disc mounted on the turbo-shaft within said shroud adjacent the cover plate and having a plurality of radial turbo-impeller blades mounted to the turbo-disc.

3. A lawn treating attachment as set forth in claim 1, wherein the turbo-jet gas nozzle means comprises a nozzle directed tangentially relative to the cylindrical shroud, and said spray nozzle is adjustable on said impeller shaft toward and away from the open bottom of the shroud.

* * * * *